United States Patent [19]

Brumat

[11] 4,257,213

[45] Mar. 24, 1981

[54] IMPLEMENT APPLICABLE TO A TRACTOR FOR SUCKER REMOVAL, BUD REMOVAL AND TOPPING OF VINES

[76] Inventor: Giuseppe Brumat, Via Gorizia 3, 34070 Farra d'Isohzo (Gorizia), Italy

[21] Appl. No.: 17,104

[22] Filed: Mar. 5, 1979

[30] Foreign Application Priority Data

Mar. 3, 1978 [IT] Italy .............................. 83338 A/78

[51] Int. Cl.³ ........................................... A01D 50/00
[52] U.S. Cl. .................................... 56/12.7; 56/15.5; 56/233; 56/237
[58] Field of Search ................................ 56/233–237, 56/27.5, 12.7, 13.6, 13.7, 303, 15.5

[56] References Cited

U.S. PATENT DOCUMENTS

| | | | |
|---|---|---|---|
| 1,731,607 | 10/1929 | Bianchi | 56/235 |
| 3,513,650 | 5/1970 | Porter | 56/234 |
| 3,570,228 | 3/1971 | Phillips | 56/234 |
| 3,597,908 | 8/1971 | Schaefer et al. | 56/233 |
| 4,067,178 | 1/1978 | Miller | 56/235 |

FOREIGN PATENT DOCUMENTS

| | | | |
|---|---|---|---|
| 2257223 | 8/1975 | France | 56/234 |
| 2377761 | 9/1978 | France | 56/233 |

*Primary Examiner*—Jay N. Eskovitz
*Attorney, Agent, or Firm*—Blair, Brown & Kreten

[57] ABSTRACT

An implement for mounting on a tractor to remove suckers and buds from the stems of vines arranged in rows and for trimming during the advance of the tractor along the ground in a direction essentially parallel to, adjacent and between the row of vines, including, a frame supported on a tractor, opposing side arms on the frame arranged on opposite sides of said tractor, removable interchangeable brush treating devices mounted on the outer end of each of the side arms, a drive on the side arms for moving the brush treating device for independent operation on both sides of said tractor, a linkage for mounting the side arms for lateral pivotal movement and for extending the side arms outwardly to a selected distance so as to be able to approach the rows of vines to be treated either on one side or other of the tractor and at the desired height. A hydraulic control system for raising and lowering the frame with respect to the tractor. Each of the brush treating devices comprising interchangeable vertical shaft rotatably driven by the drive, a plurality of flails radially supported on the vertical shaft so as to form a vertical cylindrical rotating brush for brushing the vine stems, the plurality of flails being separated in vertical sections mounted at different heights on the vertical shaft, the side arms being arranged to also support a scythe bar in substitution for the brush treating device for vertical trimming of the vines in the rows.

5 Claims, 7 Drawing Figures

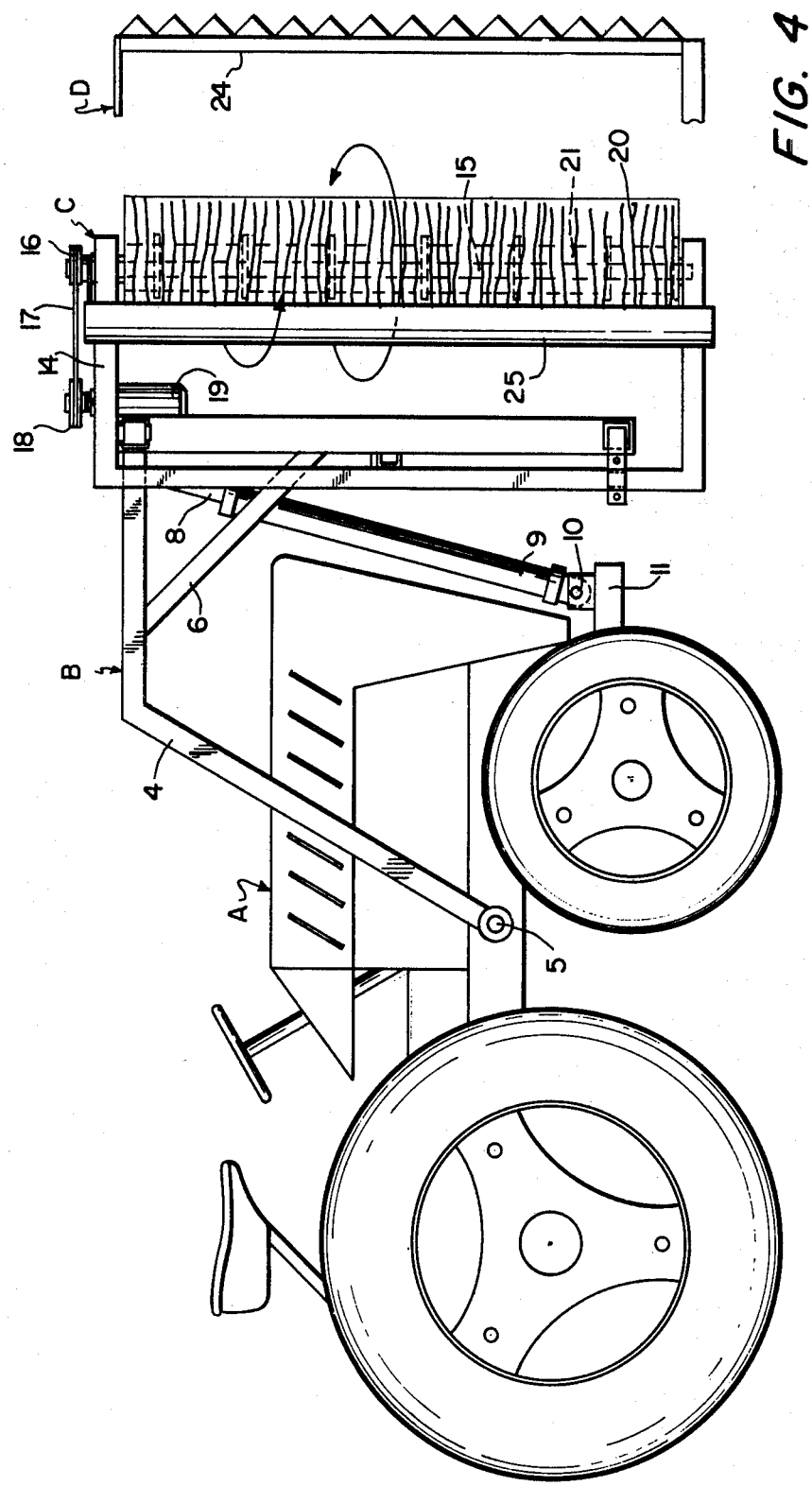

IMPLEMENT APPLICABLE TO A TRACTOR FOR SUCKER REMOVAL, BUD REMOVAL AND TOPPING OF VINES

This invention has for its object an implement applicable to a tractor for sucker removal, bud removal and topping of vines in rows.

BACKGROUND OF THE INVENTION

In the field of vinegrowing there is a need for performing the operations of sucker removal, bud removal and topping vines.

These operations, as is known by technicians in this sector, have always been done manually from the earliest times.

A certain form of mechanization of these operations has been tried only recently.

The mechanization attempt, however, it still in its initial stage and so far has not succeeded in the market because of the lack of machinery really suitable and effective for these operations.

It should be further noted that in the present state of the art only sucker removers are known that are substantially characterized by a frame generally carried behind the tractor and operating on the side of the tractor like an inverted U. At the bases of the ends of the inverted U, the frame supports a pair of arms equipped with a plurality of belts which, put in centrifugal rotation, work on both sides of the row being subjected to sucker removal to remove suckers from the stalk of the vine and, at the same time, to remove buds.

These types of known machines, recently introduced on the French market, have the drawback of being suitable exclusively for sucker removal in the French system of vinegrowing, i.e., on rows with low-pruned vines, because of the obvious difficulty that an implement of this type would encounter in working on rows with high-pruned vines.

Another drawback of this type of implement is its specificity, i.e., it is intended only for this operation.

The purpose of this invention is to achieve an implement for a tractor suitable not only for sucker removal but also for topping vines in a row, even for high-pruned vines.

Another drawback of existing machines is that with systems of known implements it is necessary to perform two separate operations: sucker and bud removal and then topping with another implement or manually.

OBJECTS AND SUMMARY OF THE INVENTION

According to the invention, said two operations can be done with the same implement, merely by changing the operating arms on the implement which are suitably structured and designed to perform both operations and, alternately, one or the other.

According to the invention, the implement consists essentially of:

a frame for a tractor equipped on both sides with opposing arms, operating on both sides of the tractor, and wherein each of said arms is articulated and/or extensible and/or able to be widened and/or able to be made longer so as to be able to approach the rows of vines to be worked either on one side or other of the tractor and at the desired height;

at least a hydraulic control system for raising and lowering said frame;

at least a control unit to make drive units operate hydraulically;

at least a pair of the hydraulically operated drive units placed opposite and suitable for operating on each end of said frame to cause the functioning of the operating units placed on each of the side arms of said implement;

at least a pair of operating arms intended for bud/sucker removal and each of them consisting of at least a standard supporting a shaft driven in rotation by said drive unit affecting said arm and radially supporting a plurality of strips or whips which, in rotation, are intended for sucker/bud removal, and where the strips or whips are divided into vertical sections to be mounted at various heights, and where this plurality of strips or whips can be protected by a whole or partial shield to prevent said whips, on command, from operating over a determined surface;

at least a pair of operating arms for topping that are substitutable and interchangeable with the preceding arms and wherein said topping arms are operated by said drive means as the preceding arms and wherein these topping arms consist of a pair of sickle bars operating vertically, juxtaposed at the height and in the position of the rotating shaft of said preceding sucker/bud removal arms.

A further characteristic of the invention consists in the fact that said arms can be folded on themselves to reduce the size of the tractor means during nonoperating movements.

Still another characteristic of the invention consists in the fact that the wheels and bars that can be used on the frame are interchangeable in various work phases for various heights.

A further characteristic of the invention and an improvement thereof consists in the fact that said shields are connected to the start and stop control devices of the operating elements for fast interposition of the shield between vines and operating elements to prevent the operating elements from damaging the parts affecting the production of the vines and also to facilitate work on all types of vineyards.

A further characteristic of the invention is to improve the preceding ones consists of a self-centering system of the oscillating arms with large recoil springs that make it possible to keep the operating arms in a self-centered work position without thereby interfering with their flexibility and being suited to the work distance.

A further characteristic of the invention consists in using on the sucker/bud removal whips a toothed surface and an opposite smooth or knurled surface and wherein reversibility of the work is provided to be able to operate more or less effectively on the vine.

The above mentioned characteristics will be better understood and shown and others will be brought out from the following detailed description of an embodiment according to the invention and with the help of the attached drawings wherein:

BRIEF DESCRIPTION OF THE DRAWINGS

FIG. 3 shows schematically in a side view a tractor means A with the implement of the invention mounted thereon, comprising a frame B, in this specific case, with the sucker/bud removal arms C mounted slightly forward in partial view;

FIG. 4 shows the end of topping arm D substitutable and interchangeable with previous arm C of FIG. 3;

DESCRIPTION OF THE PREFERRED EMBODIMENT

Figures 1, 2:
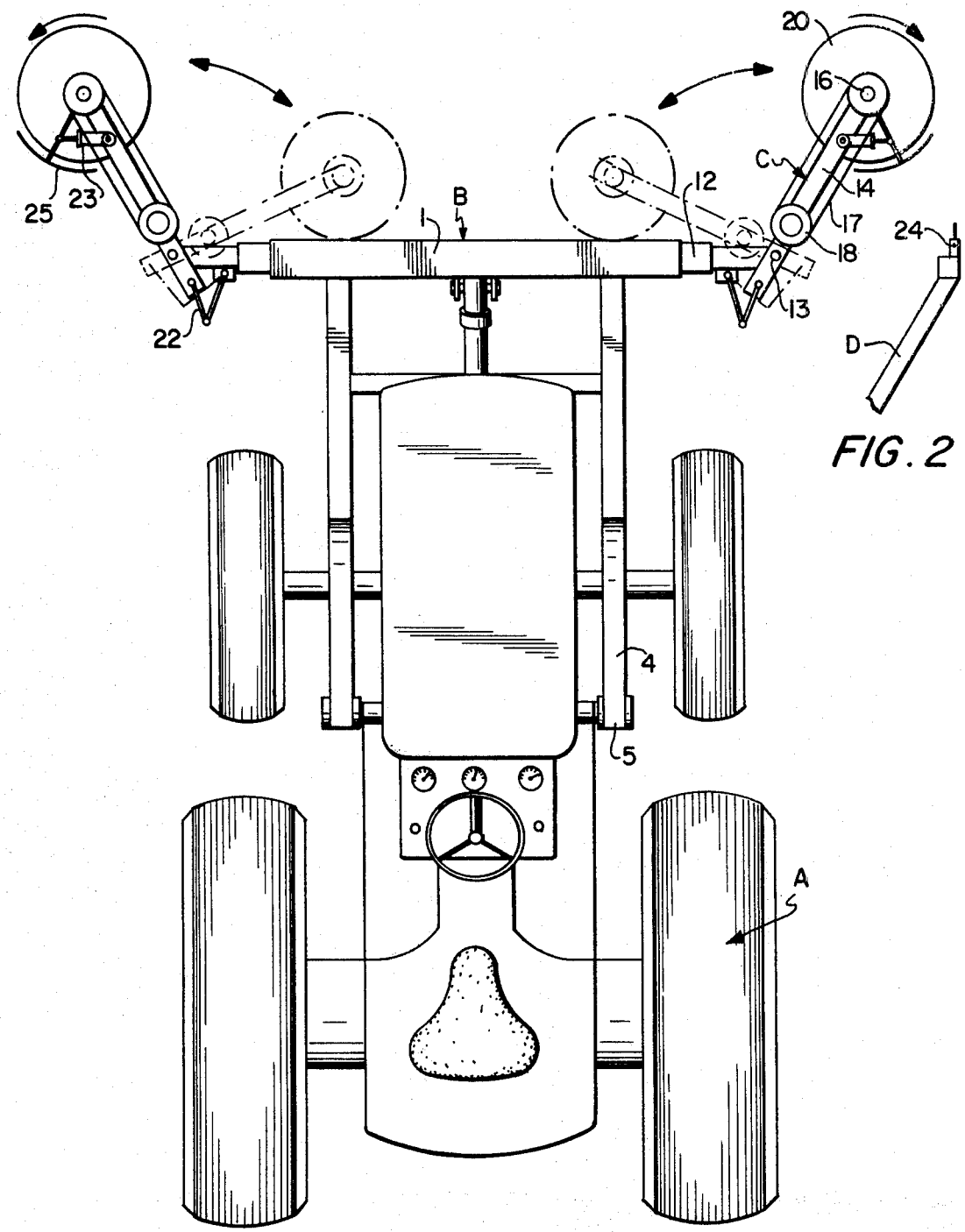
FIG. 1 shows in schematized plan view a tractor A with front mounting of the implement of the invention (in this case with a front attack system) and whose attack frame B is equipped with a pair of sucker/bud removal arms C.
FIG. 2 indicates as a variant the end of a topping arm D interchangeable and substitutable with arm C of FIG. 1.

From the above figures, it can be seen that the implement of the invention consists substantially of a frame B equipped with a front rectangular rigid structure 1 substantially arranged on the vertical plane which substantially comprises a pair of standards 2 and a pair of tubular horizontal crosspieces 3. On front frame 1 are welded a pair of parallel arms 4 that extend perpendicularly from this front frame and toward the tractor body to be anchored on the sides of the tractor by known type systems 5. Each arm 4 is connected and made rigid with front frame 1 by stiffening cross struts 6.

On the upper tubular crosspiece 3 of front frame 1 is hinged at 7 the rod 8 of a cylinder 9 of a hydraulic jack which is hinged at 10 to frame 11 of tractor A.

The tractor has mounted (not shown as it is of a known type) to the power takeoff a hydraulic oil pump with the tank for circulating the fluid under pressure, the hydraulic oil being sent also to a distributor with controls for the operator in the driver's seat of tractor A.

Said hydraulic oil distributor sends the oil, on command, from the distributor to hydraulic jack 9 causing the rod 8 to go out and in, in which case it can be seen that, on command of the operator in the driver's seat, front frame 1 of the implement can go up or down.

Upper and lower crosspieces 3 respectively of front frame 1 telescopically receive the removable, extractable, telescopic arms 12 which, at their end, support a self-centering swinging arm 14, hinged at 13, generally shaped to fit C, and whose end shaped to fit C, supports a shaft 15 mounted to rotate.

Vertical shaft 15 mounted to rotate is driven in its rotation by a pulley 16 and belt 17 of a drive pulley 18 which in turn is driven by a hydraulic motor 19 operated by the hydraulic oil regulated by said distributor from the driver's seat.

Thus, from the driver's seat it will be possible to control the rotation of shaft 15, it being provided that said motor 19 can cause the rotation of drive pulley 18 either clockwise or counterclockwise to cause the rotation of shaft 15 either clockwise or counterclockwise.

Vertical shaft 15 supports a plurality of radial flails or whips 20 that are divided into sections by spacers 21 to be mounted at the full height or partial height of arm C and corresponding rotating shaft 15.

Swinging arm 14, shaped to fit C, is self-centered by a known type spring system that keeps said arm in an inclined position and when this position is made to vary, the arm gives way flexibly, and when the force is no longer there, the arm returns to the pre-established position, this drive or spring is indicated by number 22.

p Arms 14 are driven in and out by jacks 26 and, in addition, can be folded back as in FIG. 1 according to the broken lines toward the inside at the front to reduce the size of the machine when it is not supposed to work, as indicated by the arrows.

Whip wheel 20 is surrounded by a shield 25 which, on hydraulic command by a jack 23, can be commanded to cover or not in partial rotation, the operating whipping area protecting the surfaces that would otherwise be subjected to whipping. The shield 25 can be at the full height or at various sectors of height controlled independently, preferably in two sections, one upper section at mid-height and a lower one covering the other half.

Arms C, as set forth above, are mounted to be detachable from the front frame 1 and can be substituted by arms D of a similar system, which vertically exhibit a known type inclinable sickle bar 24 on which we do not have to dwell since the mechanics of these sickle bars are widely known in the art and are of various types.

Figure 7:
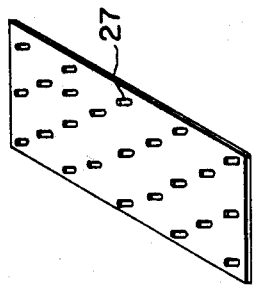
FIG. 7 is a perspective view of an enlarged part of a whip where can be seen its conformation and structuring on the surface provided with protuberances for a greater effectiveness in the sucker/bud removal operations.
Figure 6:
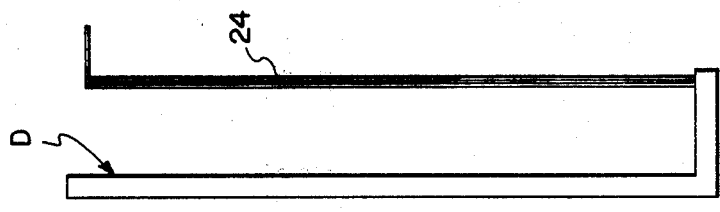
FIG. 6 is a schematized and partial front view of a part of the topping arm substitutable for the sucker/bud removal arm (FIG. 5)
Figure 5:
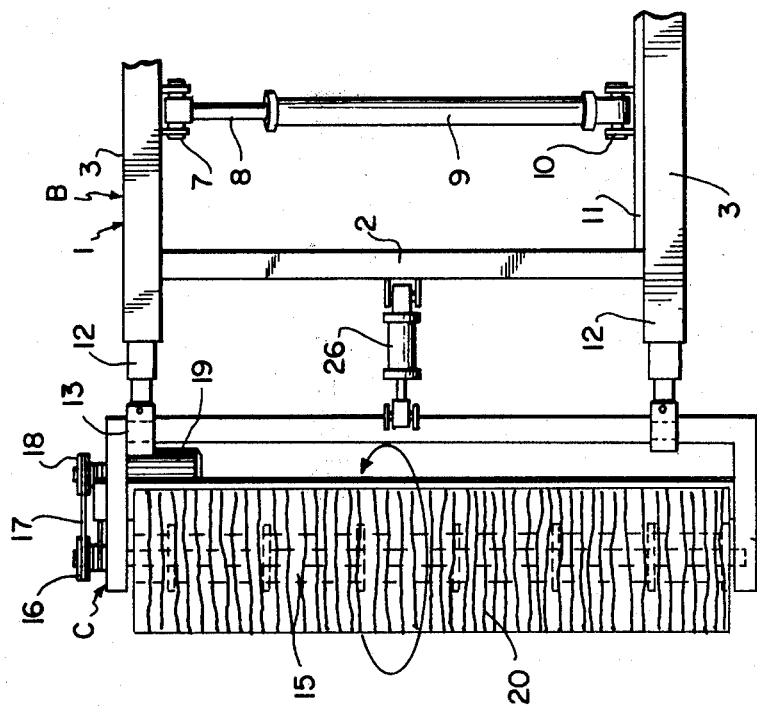
FIG. 5 shows schematically a front view half of the implement of the invention according to FIGS. 1, 3 and without showing the supporting tractor.

Finally, it can be pointed out that the whips, 20 as appears in FIG. 7, exhibit at least on one face a plurality of projections 27 that serve to promote their sucker removal operation.

Naturally, the details of embodiment can vary any way without thereby altering the scope of protection of the invention as described, illustrated and substantially claimed here below.

I claim:

1. An implement for mounting on a tractor to remove suckers and buds from the stems of vines arranged in rows and for trimming during the advance of the tractor along the ground in a direction essentially parallel to, adjacent and between said row of vines, comprising:

a frame supported on a tractor, opposing side arms on said frame arranged on opposite sides of said tractor, removable interchangeable brush treating means mounted on the outer end of each of said side arms, means on said side arms for driving said brush treating means for independent operation on both sides of said tractor, means for mounting said side arms for lateral pivotal movement and for extending said side arms outwardly to a selected distance so as to be able to approach said rows of vines to be treated either on one side or other of said tractor and at the desired height;

a hydraulic control system for raising and lowering said frame with respect to said tractor;

each of said brush treating means comprising interchangable vertical shaft rotatably driven by said driving means, a plurality of flails radially supported on said vertical shaft so as to form a vertical cylindrical rotating brush for brushing the vine stems, said plurality of flails being separated in vertical sections mounted at different heights and to act operatively at different heights on said vertical shaft;

said side arms being arranged to also support a scythe bar in substitution for said brush treating means for vertical trimming of said vines in said rows.

2. An implement in accordance with claim 1 including a sector-shaped shield mounted on each of said side arms in concentric relationship with the axis of rotation of said vertical shaft to form a protective shield for said flails during their rotation, and means for moving said shield along a circular path from a position of noninterference with the lateral whipping action of said flails to a position for preventing said lateral whipping action whereby said flails are able to operate on a determined surface of the parts of said vines at a predetermined height with reference to the production parts and the foliage of said vines.

3. An implement according to claim 2 including means for yieldingly urging said side arms out of an operative position with said brush treating means in engagement with said vines into a self-centering position such that when a lateral pressing force on said brush treating means is absent, said side arms automatically come back to said self-centering position.

4. An implement according to claim 3 including means on the outer extremity of each of said side arms for sensing said rows to maintain said brush treating means at an adequate distance from elements in said row particularly from row elements in elevation, as for example, a stake or structural parts of said vines.

5. An implement according to claim 4 wherein said flails are provided with a tooth-like surface and an opposite smooth surface and wherein said drive means are adapted to rotate said treating means in either a clockwise or a counterclockwise direction.

* * * * *